(12) United States Patent
Nunez

(10) Patent No.: US 8,534,712 B2
(45) Date of Patent: Sep. 17, 2013

(54) TUBULAR JOINT HAVING WEDGE THREADS WITH SURFACE COATING

(75) Inventor: Adrian Jose Nunez, Buenos Aires (AR)

(73) Assignee: Tenaris Connections Limited, Kingstown (VC)

( * ) Notice: Subject to any disclaimer, the term of this patent is extended or adjusted under 35 U.S.C. 154(b) by 0 days.

(21) Appl. No.: 13/284,384

(22) Filed: Oct. 28, 2011

(65) Prior Publication Data

US 2012/0104751 A1    May 3, 2012

Related U.S. Application Data

(63) Continuation of application No. 12/900,209, filed on Oct. 7, 2010.

(60) Provisional application No. 61/250,406, filed on Oct. 9, 2009.

(51) Int. Cl.
*F16L 58/02* (2006.01)
*F16L 57/06* (2006.01)
*F16L 15/00* (2006.01)

(52) U.S. Cl.
USPC .............................................. 285/94; 285/55

(58) Field of Classification Search
USPC ...................................... 285/55, 94
See application file for complete search history.

(56) References Cited

U.S. PATENT DOCUMENTS

| RE30,647 E | 6/1981 | Blose |
| 4,703,954 A * | 11/1987 | Ortloff et al. ............ 285/115 |
| RE34,467 E | 12/1993 | Reeves |
| 5,360,239 A | 11/1994 | Klementich |
| 5,454,605 A | 10/1995 | Mott |
| 6,206,436 B1 | 3/2001 | Mallis |
| 6,722,706 B2 | 4/2004 | Church |
| 2006/0197343 A1* | 9/2006 | Imai et al. ................ 285/333 |
| 2009/0033087 A1 | 2/2009 | Carcagno et al. |

FOREIGN PATENT DOCUMENTS

| WO | 2007/063079 A1 | 6/2007 |
| WO | WO 2007063079 A1 * | 6/2007 |

OTHER PUBLICATIONS

Office Action issued in related U.S. Appl. No. 12/900,209; Dated Feb. 4, 2013 (14 pages).

* cited by examiner

*Primary Examiner* — Pamela H Weiss
(74) *Attorney, Agent, or Firm* — Osha Liang LLP

(57) ABSTRACT

A threaded joint for pipes includes a pin member and a box member, the pin member having an external thread configured to correspond to an internal thread of the box member, a thread form of the internal and external threads having generally dovetail-shaped profile with stab flanks and load flanks and flat roots and crests, wherein the internal threads are increasing in width in one direction on the box and the external threads are increasing in width in the other direction on the pin, so the roots, crests, and flanks of the threads move together and form seals that resist the flow of fluids between the seals. The threaded joint further includes a fluoropolymer-based coating applied to specific regions of the internal and external threads and a resin coating disposed in regions of the internal and external threads that are devoid of the fluoropolymer-based coating, wherein the fluoropolymer-based coating and the resin coating are configured to form a layer of substantially uniform thickness on the overall surface of the internal and external threads.

10 Claims, 2 Drawing Sheets

TUBULAR JOINT HAVING WEDGE THREADS WITH SURFACE COATING

CROSS-REFERENCE TO RELATED APPLICATIONS

This present application is a continuation application, and thus claims benefit pursuant to 35 U.S.C. §120. of U.S. patent application Ser. No. 12/900,209 filed Oct. 7, 2010, currently pending, which claims priority under 35 U.S.C. §119(e), to U.S. Patent Application No. 61/250,406, filed on Oct. 9, 2009, which is assigned to the present assignee and herein incorporated by reference in its entirety.

BACKGROUND

1. Field of the Disclosure

Embodiments disclosed herein relate generally to threaded joints having wedge threads. More particularly, embodiments disclosed herein relate to wedge threads having an improved surface coating applied thereon and related methods of applying the improved surface coating.

2. Background Art

Casing joints, liners, and other oilfield tubulars are frequently used to drill, complete, and produce wells. For example, casing joints may be placed in a wellbore to stabilize and protect a formation against high wellbore pressures (e.g., wellbore pressures that exceed a formation pressure) that could otherwise damage the formation. Casing joints are sections of pipe (e.g., steel or titanium), which may be coupled in an end-to-end manner by threaded connections, welded connections, or any other connection mechanisms known in the art. As such, connections are usually designed so that at least one seal is formed between an interior of the coupled casing joints and the annulus formed between exterior walls of the casing joints and the interior walls of the wellbore (i.e., the formation). The seals may be elastomeric (e.g., an o-ring seal), thread seals, metal-to-metal seals, or any other seals known to one of ordinary skill in the art. vertical position along their central axes such as when making up a pipe string for lowering into a wellbore. Typically, in a male-female threaded tubular connection, the male component of the connection is referred to as a "pin" member and the female component is called a "box" member. As used herein, "make-up" refers to engaging a pin member into a box member and threading the members together through torque and rotation. Further, the term "selected make-up" refers to the threading of a pin member and a box member together with a desired amount of torque or based on a relative position (axial or circumferential) of the pin member with respect to the box member. Furthermore, the term "box face" is understood to be the end of the box member facing outward from the box threads and the term "pin nose" is understood to be the end of the pin member facing outward from the threads of the connection. As such, upon make-up of a connection, the nose of the pin is stabbed or inserted into and past the face of the box.

Referring to the geometry of threads, the term "load flank" designates the side wall surface of a thread that faces away from the outer end of the respective pin or box member on which the thread is formed and supports the weight (i.e., tensile load) of the lower tubular member hanging in the wellbore. Similarly, the term "stab flank" designates the side wall surface of the thread that faces toward the outer end of the respective pin or box member and supports forces compressing the joints toward each other such as the weight of the upper tubular member during the initial make-up of the joint or such as a force applied to push a lower tubular member against the bottom of a bore hole (i.e., compressive force).

One type of threaded connection commonly used in oil country tubular goods is known as a wedge thread. Referring initially to FIGS. 1A and 1B, a prior art tubular connection 100 having a wedge thread is shown. As used herein, "wedge threads" are threads, regardless of a particular thread form, that increase in width (i.e., axial distance between load flanks 225 and 226 and stab flanks 232 and 231) in opposite directions on a pin member 101 and a box member 102. The rate at which the threads change in width along the connection is defined by a variable known as the "wedge ratio." As used herein, "wedge ratio," although technically not a ratio, refers to the difference between the stab flank lead and the load flank lead, which causes the width of the threads to vary along the connection. Furthermore, as used herein, a thread "lead" refers to the differential distance between components of a thread on consecutive threads. As such, the "stab lead" is the distance between stab flanks of consecutive thread pitches along the axial length of the connection. A detailed discussion of wedge ratios is provided in U.S. Pat. No. 6,206,436, issued to Mallis, assigned to Hydril Company, and incorporated by reference in its entirety herein. Furthermore, wedge threads are extensively disclosed in U.S. Pat. No. RE 30,647 issued to Blose, U.S. Pat. No. RE 34,467 issued to Reeves, U.S. Pat. No. 4,703,954 issued to Ortloff, and U.S. Pat. No. 5,454,605 issued to Mott, all assigned to Hydril Co. and incorporated herein by reference in their entirety.

Referring still to FIGS. 1A and 1B, a pin thread crest 222 in a wedge thread coupling is narrow towards a distal end 108 of pin member 101 while a box thread crest 291 is wide. Moving along an axis 105 (from right to left), pin thread crest 222 widens while box thread crest 291 narrows as it approaches a distal end 110 of box member 102. As shown in FIG. 1A, the threads are tapered, meaning that a pin thread 106 increases in diameter from beginning to end while a box thread 107 decreases in diameter in a complimentary manner. Having a thread taper may improve the ability to stab pin member 101 into box member 102 and distribute stress throughout the connection.

Generally, thread seals are difficult to achieve in non-wedge (i.e., free-running) threads. However, thread forms that are unable to form a wedge seal in a free-running configuration may create thread seals when used in a wedge thread configuration. As should be understood by one of ordinary skill, as wedge threads do not require any particular type or geometry of thread form, a variety of thread forms may be used. One example of a suitable thread form is a semi-dovetailed thread form disclosed in U.S. Pat. No. 5,360, 239, issued to Klementich and incorporated herein by reference in its entirety. Another thread form includes a multi-faceted load flank or stab flank, as disclosed in U.S. Pat. No. 6,722,706, issued to Church and incorporated herein by reference in its entirety. Each of the above thread forms is considered to be a "trapped" thread form, meaning that at least a portion of the corresponding load flanks and/or corresponding stab flanks axially overlap.

Referring again to FIGS. 1A and 1B, in wedge threads, a thread seal may be accomplished through contact pressure caused by interference that occurs at make-up over at least a portion of connection 100 between pin load flank 226 and box load flank 225 and between pin stab flank 232 and box stab flank 231. Close proximity or interference between roots 292 and 221 and crests 222 and 291 complete the thread seal when occurring proximate to such flank interference. Generally, higher pressures may be contained either by increasing interference between the roots and crests ("root/crest interference") on pin member 101 and box member 102 or by increasing the aforementioned flank interference.

Although various wedge thread connections exist having positive-stop torque shoulders (e.g., Klementich, referenced above), wedge threads typically do not have torque shoulders, so their make-up is "indeterminate," and, as a result, the relative position of the pin member and box member may vary more during make-up for a given torque range to be applied than for connections having a positive-stop torque shoulder. For wedge threads designed to have flank interference and root/crest interference at a selected make-up, the connection is designed such that both the flank interference and root/crest interference increase as the connection is made-up (i.e., an increase in torque increases flank interference and root/crest interference). For tapered wedge threads having root/crest clearance, the clearance decreases as the connection is made-up.

Regardless of the design of the wedge thread, corresponding flanks come closer to each other (i.e., clearance decreases or interference increases) during make-up. Indeterminate make-up allows for the flank interference and root/crest interference to be increased by increasing the make-up torque on the connection. Thus, a wedge thread may be able to thread-seal higher pressures of gas and/or liquid by designing the connection to have more flank interference and/or root/crest interference or by increasing the make-up torque on the connection. However, increased interference and make-up torque may increase stress on the connection during make-up, which may lead to premature failure of the connection.

Furthermore, as shown, connection 100 includes a metal-to-metal seal 112 created by contact between corresponding seal surfaces 103 and 104, respectively located on pin member 101 and box member 102. Metal-to-metal seal 112 provides an additional measure of seal integrity (i.e., when a wedge thread seal is not sufficient) for threaded connection 100, and is particularly useful where connection 100 is intended to contain high-pressure gases. While metal-to-metal seal 112 is shown located proximate to the distal end 108 of pin member 102, it should be understood by one of ordinary skill in the art that metal-to-metal seal 112 may be positioned anywhere along the length of connection 100, including, but not limited to, a location proximate to distal end 110 of box member 102.

In certain instances, one or more "dry" surface coatings may be applied to the thread surfaces of a connection for various reasons, such as to improve the sealing characteristics of the threaded connection, resist galling of the threads, and provide corrosion resistance. The surface coating may be characterized as dry because it permanently adheres to the thread form, rather than being applied as a flowing dope-type lubricant. For example, U.S. Publication No. 2009/0033087, assigned to the assignee of the present application, discloses a threaded joint having free-running threads and a surface coating applied in multiple layers. However, wedge threads present new difficulties for surface coatings because of the intricate and high-tolerance sealing characteristics of the thread forms themselves. Accordingly, there exists a need for a dry surface coating for wedge thread surfaces that exhibit the beneficial characteristics of surface coatings currently applied to free-running threads.

SUMMARY OF THE DISCLOSURE

In one aspect, embodiments disclosed herein relate to a threaded joint for pipes including a pin member and a box member, the pin member having an external thread configured to correspond to an internal thread of the box member, a thread form of the internal and external threads having generally dovetail-shaped profile with stab flanks and load flanks and flat roots and crests, wherein the internal threads are increasing in width in one direction on the box and the external threads are increasing in width in the other direction on the pin, so the roots, crests, and flanks of the threads move together and form seals that resist the flow of fluids between the seals. The threaded joint further includes a fluoropolymer-based coating applied to specific regions of the internal and external threads and a resin coating disposed in regions of the internal and external threads that are devoid of the fluoropolymer-based coating, wherein the fluoropolymer-based coating and the resin coating are configured to form a layer of substantially uniform thickness on the overall surface of the internal and external threads.

In other aspects, embodiments disclosed herein relate to a method of improving threaded surfaces of a pipe joint, the method including providing a pin member having external wedge threads, and a box member having internal wedge threads configured to correspond with the external wedge threads of the pin member, surface treating an overall surface of the internal and external wedge threads, applying a fluoropolymer-based coating to specified regions of the internal and external wedge threads, and applying a resin coating, subsequent to fluoropolymer-based coating, to the overall thread surface of the internal and external threads, wherein the resin coating is configured to adhere to regions devoid of the fluoropolymer-based coating.

Other aspects and advantages of the invention will be apparent from the following description and the appended claims.

DETAILED DESCRIPTION

Figure 1A:
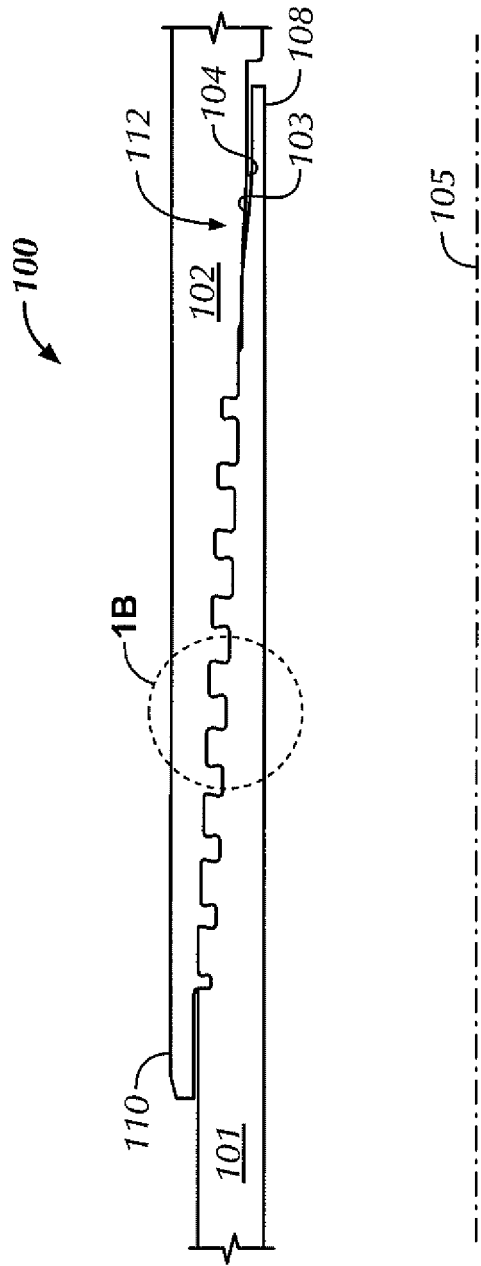
FIGS. 1A and 1B show cross-sectional views of a prior art tubular connection having wedge threads.
Figure 1B:
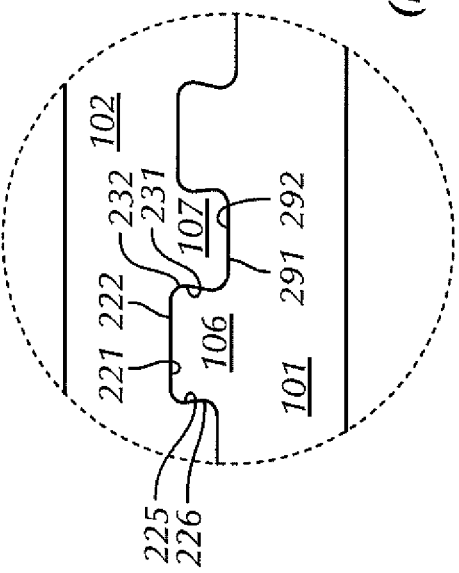
Figure 2:
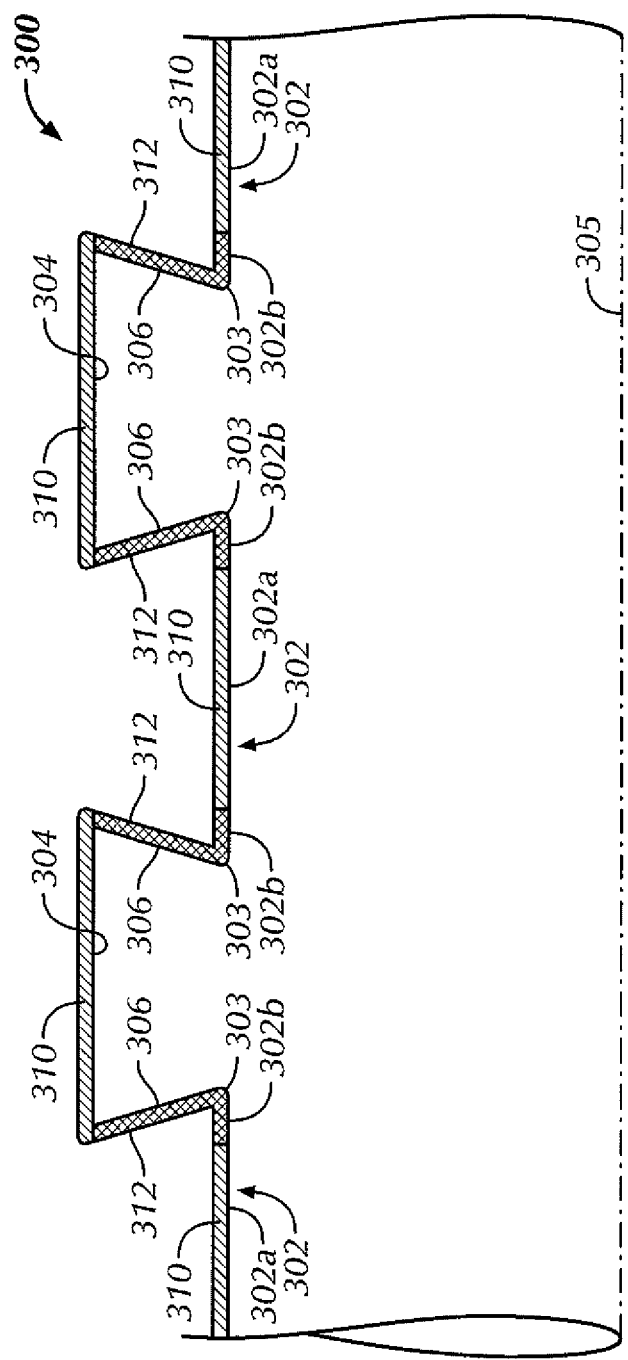
FIG. 2 shows a cross-sectional view of a wedge thread having a thread surface coating in accordance with embodiments of the present disclosure.

In one aspect, embodiments disclosed herein relate to a surface coating that is applied to wedge threads and related methods of applying the surface coating to wedge threads. Referring to FIG. 2, a cross-sectional view of a wedge thread form having a surface coating 300 is shown in accordance with embodiments of the present disclosure. Surface coating 300 includes a first coating 310 and a second coating 312, which together form the single uniform surface coating layer 300 on an overall surface of the thread form. While FIG. 2 depicts a surface coating 300 applied to the threads of a pin member, it should be understood that surface coating 300 may be applied to both the threads of a pin member and a box member, or only the threads of the pin member, or only the threads of the box member. In certain embodiments, the surface coating 300 may be applied to the box member and another corrosion resistant coating and/or a lubricant is applied on the pin member.

In embodiments disclosed herein, multiple coating applications may be required to ultimately complete surface coating 300 as a single uniform coating layer that completely covers the entire thread surface. An application method in accordance with embodiments disclosed herein may proceed as follows. Initially, a previous surface treatment (i.e., chemical or mechanical surface treatment) (not shown in FIG. 2) may be applied to an entire thread surface to prepare the thread surface for subsequent coatings. Chemical treatments may be a preparatory coating for the thread surfaces and may not have any substantial thickness. The chemical coating may include, but is not limited to, a phosphate coating, an oxalate coating, and a borate coating. The chemical coating forms a base on the thread surfaces to promote maximum adherence of subsequent coatings to thread surfaces and to prevent galling and corrosion of the thread surfaces. For example, a surface finish, or roughness, of the thread surfaces may be required to be within a certain range after application of the chemical coating to allow for proper adherence to the thread surfaces by subsequent coatings. Mechanical treatments may include blasting or other abrasive treatments. In certain embodiments, the average surface roughness (Ra) may be within a range of about 2.0 micrometers and 6.0 micrometers. In other embodiments, the average surface roughness may be within a range of about 2.0 and 4.0 micrometers.

After the surface treatment, first coating 310 may be applied to the thread surfaces. First coating 310 may be applied along with a solvent, which reduces the viscosity of the mixture to an application viscosity (i.e., thins the mixture so it can be applied more easily to the thread surfaces). Typical organic solvents that may be used in the coating mixture include, but are not limited to, 2-methoxy-1methyl-ethyl acetate, xylene, acetone, tetrahydrofuran, methyl ethyl ketone, ethyl acetate, propyl acetate, butyl acetate, isobutyl acetate, methyl isobutyl ketone, methyl amyl acetate, diisobutyl ketone, ethylene glycol monomethyl ether acetate, ethylene glycol monoethyl ether, and mixtures of the above. After application of the first coating 310 on the thread surfaces, the solvent typically evaporates from the mixture, leaving the first coating 310 as a layer on the thread surfaces.

First coating 310 may generally be applied to specific regions of the thread surfaces, namely, thread crest surfaces 304 and substantially central regions 302A of the thread root surfaces 302. First coating 310 may be applied only to substantially central regions of thread roots surfaces 302 due to the application method of the first coating 310 and limitations imposed by the structure of wedge threads. First coating 310 may generally be applied in a radial direction to the threads (e.g., in a direction substantially perpendicular to central axis 305). The radial direction may be employed as it may produce a more uniform distribution at the root surface, thus requiring fewer passes applying subsequent coatings.

Because of this particular application method, the structure of the thread form may impose limitations as to the regions of the thread form to which the first coating 310 may be applied. As previously described, wedge threads may be characterized, in certain embodiments, as a trapped or dove-tailed shaped thread form. As illustrated in FIG. 2, a dove-tailed thread form may have a smaller axial width near thread root 302 and a larger axial width near thread crest 304. Thus, a portion or region of thread root 302 is overlapped or covered by adjacent thread crests 304. Substantially central regions of thread roots 302 are indicated by 302A in FIG. 2, while the overlapped regions are indicated by 302B. Therefore, first coating 310 may only be applied to a substantially central region 302A of the thread roots 302, while it is applied to an entire surface of the thread crests 304. First coating 310 may have substantially low friction and low superficial tension properties (i.e., subsequent coatings may not adhere to first coating easily). Low friction values in accordance with embodiments disclosed herein may be less than about 0.08. In other embodiments, low friction values may be less than about 0.04. The low superficial tension properties of the first coating 310 may be beneficial to the application of a second coating, described as follows.

Second coating 312 may be applied after first coating 310 to an overall surface of the threads by pouring, spraying or brushing. However, due to the low superficial tension properties of first coating second coating 312 may be repelled by first coating 310 and migrate to the uncoated regions of the thread form. The second coating 312 may generally be repelled by the first coating 310 due to the difference of the surface energy between coatings; the surface energy of the second coating may be higher than the surface energy of the first coating. In certain embodiments, the second coating may have a surface energy at least twice that of the first coating. Low values for surface energy in accordance with embodiments disclosed herein may be values less than about 50 dynes/cm. In other embodiments, low values for surface energy may be less than about 20 dynes/cm.

After first coating 310 is applied, the uncoated regions of the thread form may generally include the thread flanks 306 (both stab and load flanks) and outermost regions 302B (axially) of the thread root 302, which extend away from the central region 302A and toward a transition 303 in the thread form transitions 303 from the thread root 302 to thread flanks 306. After application of second coating 312, a single layer uniform surface coating 300 (i.e., constant thickness coating) is present on the thread surfaces of the connection. The surface coating 300 may be cured by heat treatment if required. In certain embodiments, post-application heat treatment up to about 150 degrees Celsius, or higher depending on the coatings, may be performed.

In one example, first coating 310 may be a fluoropolymer-based coating. The fluoropolymer-based coating may include a fluoropolymer solid (e.g., a powder) that is dispersed in a thermoset, such as an epoxy. The epoxy may be formed from an epoxide (such as conventional glycidyl epoxies including, but not limited to, diglycidyl ether of bysphenol-A and novalac epoxy resins, as well as any other epoxy known in the art) and a curing agent, which are known in the art. The fluoropolymer-based coating may include a reactive epoxy that may react with a curing agent to form a thermoset network having the fluoropolymer distributed therein. The thermoset may be delivered (i.e., applied) as an unreacted but reactive resin that may cure upon application on the desired thread surfaces.

The fluoropolymer solid may be dispersed within the epoxy in specified ratios to exhibit the desired characteristics of the first coating (e.g., sealability, galling resistance, corrosion resistance, durability, etc.) In certain embodiments the fluoropolymer solid may contribute about 20-40 weight percent and the epoxy may contribute about 40-60 weight percent. Additionally, titanium dioxide may be present in the mixture and contribute 5-15 weight percent In embodiments disclosed herein, a thickness of first coating 310 may vary within a range of about 10-40 micrometers.

In certain embodiments, the fluoropolymer powder may be polytetrafluoroethylene ("PTFE"). Other examples of fluoropolymers that may be used in embodiments disclosed herein include, but are not limited to, perfluoroalkoxy polymer resin ("PFA"), fluorinated ethylene-propylene ("FEP"), polyethylenetetrafluoroethylene ("ETFE"), polyvinylfluoride ("PVF"), polyethylenechlorotrifluoroethylene ("ECTFE"), polyvinylidene fluoride ("PVDF"), polychlorotrifluoroethylene ("PCTFE"), and perfluoropolyether fomblin ("PFPE").

Second coating 312 may be a polymeric resin, which is applied to cover uncovered surfaces of the threads, or surfaces not already covered by the first coating 310. Second coating 312 may have elastic properties after being applied to the thread surfaces. The function of the polymeric resin is to fill the gaps which have been generated by the first coating. The elastic property is beneficial because the material will recover its shape after each make & break with its sealing capacity intact. The types of resin that may be used as the second coating may include, but are not limited to, epoxy, polyester, and ester epoxy resin. In embodiments disclosed herein, a thickness of second coating 312 may vary within a range of about 10-40 micrometers. Because of the low friction and low superficial tension properties of first coating 310, the second coating 312, or resin, may be selectively distributed to regions of the thread surfaces devoid of the first coating 310. In other words, low friction properties of first coating 310 may encourage (e.g., by repelling) second coating 312 to migrate to regions of the thread surfaces that are devoid of the first coating 310. Thus, first coating 310 and second coating 312 form a single uniform coating layer 300 on the overall thread surface by occupying their separate respective regions, which are described in detail below.

In alternate embodiments, a copper plating layer may be applied to the thread surfaces prior to application of a coating. In certain embodiments, the surface treatment may provide an average surface roughness (Ra) within a range of about 2.0 micrometers and 6.0 micrometers. In other embodiments, the average surface roughness may be between about 2.0 and 4.0 micrometers. Corrosion-resistant alloys may have a higher chrome content to withstand more aggressive or extreme downhole environments. Those skilled in the art will understand selection of corrosion-resistant alloys.

Advantageously, embodiments of the present disclosure provide a thread surface coating having improved anti-galling and seizure resistance characteristics, which allows the threaded connection have such a surface coating to endure multiple make-ups and break-outs. Increasing the life of a threaded connection over multiple make-ups and break-outs may reduce costs associated with replacing worn or damaged threaded connections. Test data has shown that a wedge thread connection having surface treatment in accordance with embodiments disclosed herein, having been made-up with torque values between about 9,500 ft-lbs. and 20,000 ft-lbs. torque experience no galling of thread or seal surfaces in any of the consecutive make-ups and break-outs.

Additionally, the surface coating of embodiments disclosed herein may provide lubricant characteristics for the threaded connection by eliminating metal on metal contact during make-up. Further, the surface coating may improve the sealing characteristics of the threaded connection. Still further, the surface coating may provide improved corrosion resistance, thereby increasing the useful life of the threaded connection. Maintenance and equipment replacement costs may be reduced the longer the threaded connection can remain in service. Finally, the surface coating is environmentally friendly and does not contain any potentially contaminating elements.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A threaded joint for pipes comprising:
a pin member and a box member, the pin member having an external thread configured to correspond to an internal thread of the box member;
a thread form of the internal and external threads having generally dovetail-shaped profile with stab flanks and load flanks and flat roots and crests;
wherein the internal threads are increasing in width in one direction on the box and the external threads are increasing in width in the other direction on the pin, so the roots, crests, and flanks of the threads move together and form seals that resist the flow of fluids between the seals;
a fluoropolymer-based coating applied to specific regions of the internal and external threads; and
a resin coating disposed in regions of the internal and external threads that are devoid of the fluoropolymer-based coating, wherein the resin coating is applied, subsequent to the fluoropolymer-based coating, to an overall thread surface of the internal and external threads;
wherein the fluoropolymer-based coating and the resin coating are configured to form a single layer of substantially uniform thickness on the overall surface of the internal and external threads.

2. The threaded joint of claim 1, wherein the fluoropolymer-based coating is applied to thread crests and substantially central regions of thread roots of the internal and external threads.

3. The threaded joint of claim 1, wherein the fluoropolymer-based coating comprises a mixture of about 20-40 weight percent of a polytetrafluoroethylene and about 40-60 weight percent epoxy resin.

4. The threaded joint of claim 1, wherein a chemical coating is applied to an overall surface of the internal and external threads prior to application of the fluoropolymer-based coating.

5. The threaded joint of claim 4, wherein the chemical coating is selected from a group consisting of a phosphate coating, an oxalate coating, and a borate coating.

6. The threaded joint of claim 1, wherein a mechanical surface treatment is applied to an overall surface of the internal and external threads prior to application of the fluoropolymer-based coating.

7. The threaded joint of claim 1, wherein the fluoropolymer-based coating comprises a radial thickness within a range of about 10 to about 40 micrometers.

8. The threaded joint of claim 1, wherein the resin coating comprises a thickness within a range of about 10 to about 40 micrometers.

9. The threaded joint of claim 1, wherein the fluoropolymer-based coating comprises polyfluorotetraethylene.

10. The threaded joint of claim 1, wherein the resin coating does not adhere to the fluoropolymer-based coating.

* * * * *